Nov. 12, 1963　　　G. E. TRANBARGER ETAL　　　3,110,355
PARKING BRAKE RELEASE

Original Filed Sept. 22, 1959　　　　　　　　2 Sheets-Sheet 1

INVENTORS
Glen E. Tranbarger
Lester Murray
Kenneth W. Young
John G. Mehagan
BY C. R. Meland
THEIR ATTORNEY

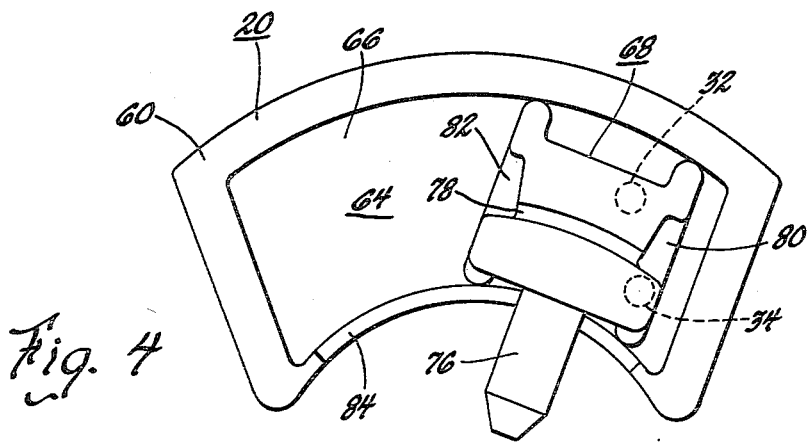
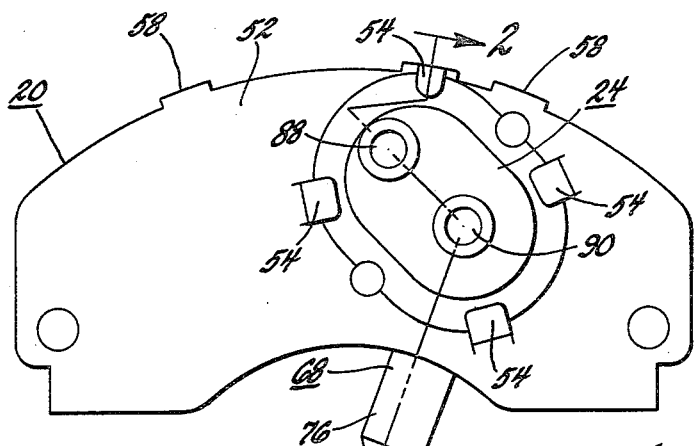
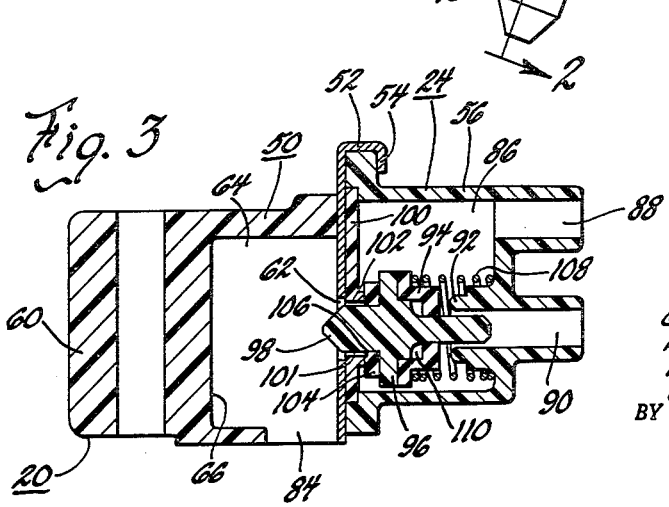

United States Patent Office 3,110,355
Patented Nov. 12, 1963

3,110,355
PARKING BRAKE RELEASE

Glen E. Tranbarger, Anderson, Ind., Lester Murray, Lathrup Village, Mich., and Kenneth W. Young and John G. Mehagan, Anderson, Ind., assignors to General Motors Corporation, Detroit, Mich., a corporation of Delaware
Original application Sept. 22, 1959, Ser. No. 841,548, now Patent No. 3,051,801, dated Aug. 28, 1962. Divided and this application Dec. 18, 1961, Ser. No. 167,458
4 Claims. (Cl. 180—82)

This invention relates to a controller and system for simultaneously controlling a parking brake release mechanism and engine starting circuit of a motor vehicle. This application is a division of application S.N. 841,548, filed on September 22, 1959 now Patent No. 3,051,801.

In operating motor vehicles it frequently happens that the parking brake is not released after the engine is started and the operator shifts the transmission in an attempt to put the vehicle in motion. In order to prevent this, warning lights have at times been installed on motor vehicles to warn the driver that the parking brake has not been released. It also has been proposed to automatically cause a parking brake to be released when the automatic transmission of the vehicle is shifted from the neutral position to some driving position.

The present invention is concerned with causing the parking brake to be released when the selector lever of an automatic transmission is shifted to some driving position and further wherein the starting circuit for controlling cranking of the engine is opened when the parking brake is released and remains closed when the parking brake is not released.

It accordingly is an object of this invention to provide a control system for a motor vehicle wherein the parking brake of the vehicle is released simultaneously with the opening of the starting circuit for cranking the engine and wherein the starting circuit remains closed when the parking brake is not released.

Another object of this invention is to provide a control system for a motor vehicle wherein a single controller operated by a transmission selector lever controls the releasing of the parking brake and operation of the engine starting circuit.

A further object of this invention is to provide a combined electric switch and valve mechanism wherein movement of a part of the switch controls operations of the valve mechanism.

Still another object of this invention is to provide a combined electric switch and vacuum valve apparatus wherein means is provided for venting a chamber containing the valve to atmosphere through the switch under certain conditions of operation.

Further objects and advantages of the present invention will be apparent from the following description, reference being had to the accompanying drawing wherein preferred embodiments of the invention are clearly shown.

In the drawings:

FIGURE 3 is a view similar to FIGURE 2 but showing the switch in a shifted different position.

FIGURE 4 is a view taken along line 4—4 of FIGURE 2.

FIGURE 5 is a plan view of a combined switch and vacuum valve made in accordance with this invention.

Figure 1:
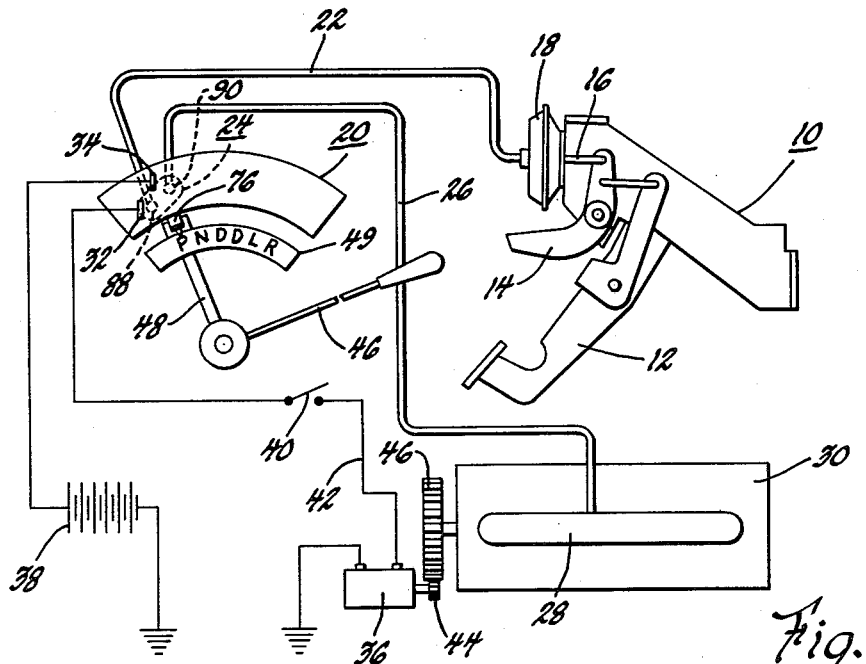
FIGURE 1 is a schematic illustration of a motor vehicle control system made in accordance with this invention.

Referring now to the drawings and more particularly to FIGURE 1, the reference numeral 10 is used to generally designate a parking brake mechanism. The mechanism may be of any construction well known to those skilled in the art but preferably includes a pedal 12 which is operated to apply the parking brake and a lever 14 which when actuated releases the parking brake. Lever 14 is connected to a rod 16 which is in turn connected with the movable diaphragm of a vacuum motor designated by reference numeral 18. The vacuum motor may be of any well known construction including a diaphragm and a spring and when the vacuum motor 18 is connected with a source of vacuum the rod member 16 is moved against the bias of the spring to move lever 14 and release the parking brake.

A combined switch and vacuum valve generally designated by reference numeral 20 is provided which controls the application of vacuum to the vacuum motor 18 and also controls the starting motor circuit for cranking the engine of the motor vehicle. It is seen that a pipe 22 connects the vacuum motor 18 with the vacuum valve 24. A pipe 26 also connects the valve 24 with the intake manifold 28 of the vehicle internal combustion engine 30. It will be appreciated that the line 26 need not be connected directly to the intake manifold 28 but could be connected to any line or chamber that is under vacuum.

The controller 20 includes a pair of switch contacts 32 and 34 which are at times connected together to provide a circuit for energizing the starting motor 36. It is seen that the contact 34 is connected to one side of battery 38 whereas the opposite side of the battery is grounded. The switch contact 32 is connected to one side of a manually operable switch 40, the opposite side of the switch being connected with one terminal of the electric starting motor 36 via lead wire 42. The other terminal of the electric starting motor 36 is connected directly to ground as shown.

The electric starting motor 36 may be of any well known construction and drives a pinion 44 which in turn drives the ring gear 46 of the engine 30. It will be appreciated that when the starting motor 36 is energized the engine 30 will be cranked and this only occurs when the switch contacts 32 and 34 are connected together and when the switch 40 is closed.

A transmission selector lever designated by reference numeral 46 is provided that controls the setting of any conventional automatic transmission (not shown) that controls application of power from the engine to the rear wheels of the vehicle in a well known manner. The lever 46 moves an arm 48 that in turn actuates the controller 20. The lever 46 may be moved between park, neutral, low, reverse and drive positions as indicated by indicator plate 49. The controller 20 is illustrated in FIGURES 2 through 6 and as will become more readily apparent hereinafter operation of the transmission selector lever 46 will control both the valve 24 and the connection of switch contacts 32 and 34. The controller 20 is so designed that when the transmission selector lever is in the park or neutral position, the valve 24 remains closed so that the parking brake cannot be released. When the transmission is in the park or neutral position, the contacts 32 and 34 are connected so at this time the engine may be cranked. When the transmission is shifted to either drive position, to low position or to reverse position, the valve 24 connects vacuum lines 22 and 26 to cause the parking brake to be released and the switch contacts 32 and 34 become disconnected so that the starting motor 36 can no longer be energized.

Referring now to FIGURES 2 through 6, the controller which is designated by reference numeral 20 includes the valve section 24 and the switch section 50. The valve 24 and the switch 50 are supported by a sheet metal member 52 having tab portions 54 bent over the housing 56 of the valve. Sheet metal member 52 also has tab portions 58 which are bent over the housing 60 of the switch. It thus is seen that the sheet metal member 52 serves to support both the switch section 50 of the controller and the valve section 24. The sheet metal member 52 has an opening 62, the purpose of which will be more fully described hereinafter.

The switch section of the controller 20 includes the housing member 60 formed of a suitable plastic insulating material and having a chamber 64. The chamber 64 is arcuately extending as is more readily apparent from FIGURE 4. The rear wall 66 of the chamber carries the fixed electrical contacts 32 and 34 which may be the heads of rivets that extend through the housing 60 and which also support terminal connections (not shown).

The chamber 64 receives a contact carrier designated in its entirely by reference numeral 68. This contact carrier is formed of suitable insulating material and has a recessed portion 70 which receives a spring 72. The spring 72 urges an electrical contactor 74 into engagement with the rear wall of chamber 66 and into engagement with fixed contacts 32 and 34 when the contact carrier is in the position illustrated in FIGURE 4. The fixed contacts 32 and 34 and the contactor 74 are so positioned that the contactor 74 connects fixed contacts 32 and 34 in certain predetermined positions of the contact carrier 68.

The contact carrier 68 has a projecting portion 76 which is shifted by the arm 48 in FIGURE 1. The contact carrier 68 in addition has a slot 78 which communicates with recessed portions 80 and 82 of the contact carrier. The projecting portion 76 of the contact carrier slides within a slot 84 formed in the switch housing 60. It is seen from FIGURE 2 that the slot 78 formed in the contact carrier is in communication with the opening 62 formed in the sheet metal part 52 in certain predetermined positions of the contact carrier. The contact 74 and the fixed contacts 32 and 34 are so arranged that when the lever 48 shown in FIGURE 1 is in the park and neutral positions the contactor 74 connects the contacts 32 and 34. When the lever 48 is in either drive position, in low position or in reverse position, the contactor 74 is shifted so that it no longer connects fixed contacts 32 and 34.

The valve section of the controller 20 includes a housing 56 formed of suitable plastic insulating material such as nylon. This housing has a chamber 86 which communicates with passages 88 and 90 formed in cylindrical extensions of the housing. The passage 90 terminates in a valve seat 92 which cooperates with a valve member 94 formed of elastomeric material such as rubber. The valve member 94 is carried by a plunger 96 formed of suitable plastic insulating material such as nylon and having a nose portion 98 which at times engages one side of the contact carrier 68. It is seen that the nose portion 98 of the plunger 96 is positioned within the opening 62 fomed in sheet metal member 52.

A plate 100 formed of suitable insulating material is fitted between the sheet metal member 52 and the housing 56 and has a central opening 101 that receives the nose portion 98 of plunger 96. The opening 101 in plate member 100 is circular but has cutaway portions or passages 102 as is clearly apparent from FIGURE 6. The circular portion of the opening 101 tightly embraces the nose 98 of plunger member 96 whereas the passages 102 are aligned with the opening 62 in sheet metal member 52 as is clearly apparent from FIGURE 2. The plunger member 96 also carries a second valve member 104 formed of a suitable elastomeric material such as rubber which at times engages the valve seat portion 106 of plate member 100. A spring 108 is positioned between a wall portion of the housing and the valve member 94 for constantly urging the plunger 96 leftwardly in FIGURE 2.

It should be noted that the valve member 94 is spaced somewhat from the plunger at 110 to take up any overtravel of the plunger member 96.

In making use of the controller 20 in FIGURE 1, the passage 88 is connected with pipe 22 and thus is connected with the vacuum motor 18. The passage 90 of the controller is connected with pipe 26 and thus is connected with the vacuum source. With the transmission selector lever 46 in either the park or neutral positions, the contact carrier 68 is in the position illustrated in FIGURES 2 and 4 so that the fixed contacts 32 and 34 are connected by shiftable contactor 74 and the valve plunger 96 is held in the position shown in FIGURE 2 by the contact carrier 68. In this position of the contact carrier, a circuit may be made for the starting motor 36 by closure of the manually operable switch 40 and the engine 30 thus may be cranked. In this position of the contact carrier 76, the passage 90 is blocked since the valve member 94 is tightly seated on the valve seat 92. With passage 90 blocked the passage 88 is connected with atmosphere via chamber 86, passages 102 in plate member 100, opening 62 in sheet metal member 52, through the slot 78 and recessed portions 80 and 82 of the contact carrier 68, through chamber 64 and thence through the slot 84 to atmosphere. It thus can be seen that when the valve member is in the FIGURE 2 position the vacuum motor 18 will be connected with atmosphere thus permitting the spring loaded diaphragm of the vacuum motor 18 to move in one direction.

When the transmission selector lever 46 is shifted to some position other than park or neutral, the contact carrier is shifted within the arcuately extending chamber 64 to a position wherein the contactor 74 no longer connects the contacts 32 and 34. In addition, this shifting causes the contact carrier to shift out of engagement with the nose portion 98 of plunger 96. This position is depicted in FIGURE 3 and it is seen that the spring 108 urges the valve member 104 into engagement with valve seat 106 when the contact carrier 68 no longer engages the plunger 96. When the spring shifts the valve member to the FIGURE 3 position, the ports or passages 88 and 90 are connected through chamber 86 and the vacuum motor 18 is then connected with vacuum. When motor 18 is connected with vacuum it operates the rod 16 to release the parking brake mechanism 10. In this position of the contact carrier, the contacts 32 and 34 are no longer connected so that the starting motor 36 cannot be energized. It will be appreciated that the starting motor circuit is opened and the vacuum motor 18 energized substantially simultaneously when the transmission is shifted from the neutral position to the drive position.

Figure 2:
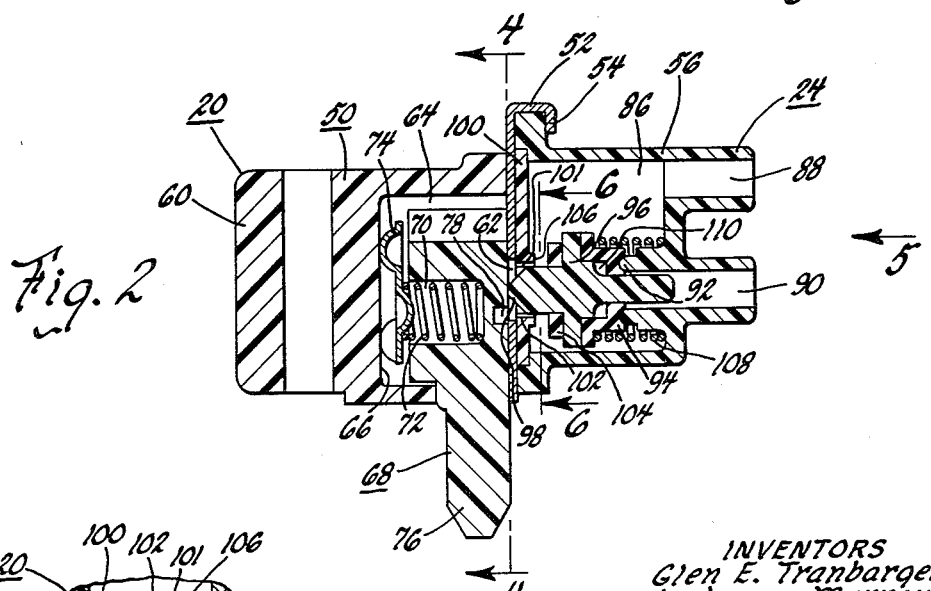
FIGURE 2 is a sectional view taken along line 2—2 of FIGURE 5.
Figure 6:
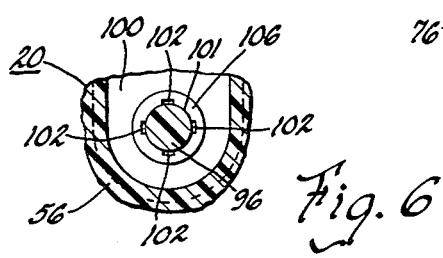
FIGURE 6 is a sectional view taken along lines 6—6 of FIGURE 2.

If the transmission selector lever is now shifted back to the neutral position from the drive position, the contact carrier 68 cams the plunger 96 rightwardly in FIGURE 2 against the bias of spring 108 to force the valve member 94 into tight engagement with valve seat 92. The switch contacts 32 and 34 are once more connected by the shiftable contactor 74. When this occurs, the vacuum motor 18 is vented to atmosphere in a manner described hereinbefore so that no releasing actuation of the parking brake occurs and the starting motor circuit may now once more be made through the shorted fixed contacts 32 and 34.

It will be apparent from the foregoing that a single controller has been provided which operates to release a parking brake mechanism and to open the starting motor circuit of the vehicle whenever the transmission selector lever is shifted from neutral position to drive position. It also will be apparent that the single controller operates to provide a circuit for the electric starting motor whenever the transmission is shifted to the park and neutral positions and also prevents releasing of the parking brake by the vacuum motor when the transmission is in the park and neutral positions.

While the embodiments of the invention as herein disclosed constitute preferred forms, it is to be understood that other forms might be adopted.

What is claimed is as follows:

1. In combination, a motor vehicle having an engine, said engine having an intake manifold, a source of direct current, an electric starting motor for cranking said engine, a parking brake mechanism for said motor vehicle, means for manually actuating said parking brake mechanism, a vacuum motor for releasing said parking brake mechanism, a controller having first and second passages and first and second fixed electrical contacts, said controller having a valve means for connecting and disconnecting said passages and a contact for connecting and disconnecting said fixed electrical contacts, said controller having a shiftable element operatively connected with both said contact and valve means, said shiftable element in one position causing said passages to be connected and said contacts to be disconnected and in another position causing said passages to be disconnected and said contacts to be connected, a transmission selector lever mechanically coupled to said shiftable element of said controller, means connecting said first fixed electrical contact with said source of direct current, means connecting said second fixed electrical contact with said electric starting motor, means connecting said first passage with said intake manifold of said engine and means connecting said second passage with said vacuum motor.

2. In combination, a motor vehicle having an engine, said engine having an intake manifold, a source of direct current, an electric starting motor for cranking said engine, a parking brake mechanism for said motor vehicle, means for manually actuating said parking brake mechanism, a vacuum motor for releasing said parking brake mechanism, an electrical switch means, a valve means, a support which is common to both said switch means and said valve means, a shiftable element common to both said switch means and said valve means, said valve means being closed and said switch means being open in one position of said shiftable element and said valve means being open and said switch means being closed in another position of said shiftable element, a transmission selector means, means mechanically connecting said transmission selector means and said shiftable element, means connecting said switch means between said source of direct current and said electric starting motor and means connecting said valve means between said vacuum motor and said intake manifold of said engine.

3. In combination, a motor vehicle having an engine, said engine having an intake manifold, a source of direct current, an electric starting motor for cranking said engine, a unitary controller having a valve means and a switch means, said controller having a shiftable means for simultaneously operating said valve means and switch means, said switch means being closed and said valve means being open in one position of said shiftable element and said switch means being open and said valve means being closed in another position of said shiftable element, a manually operable transmission selecting means, means mechanically connecting said transmission selecting means with said shiftable element, a parking brake mechanism for said motor vehicle, means for manually actuating said parking brake mechanism, a vacuum motor for releasing said parking brake mechanism, means connecting said switch means between said source of direct current power and said electric starting motor, and means connecting said valve means between said vacuum motor and said intake manifold.

4. In combination, a motor vehicle having an engine, said engine having an intake manifold, a source of direct current, an electric starting motor for cranking said engine, a parking brake mechanism for said motor vehicle, means for manually actuating said parking brake mechanism, a vacuum motor for releasing said parking brake mechanism, a controller having a movable valve element and a shiftable electrical contact, a shiftable element directly engaging both said valve element and said contact, said valve element forming a part of a valve means and said contact forming a part of a switch means, said valve means being open and said switch means being closed in one position of said shiftable element and said valve means being closed and said switch means being open in another position of said shiftable element, transmission selecting means mechanically connected with said shiftable element, means connecting said valve means between said intake manifold and said vacuum motor, and means connecting said switch means between said source of direct current and said electric starting motor.

References Cited in the file of this patent

UNITED STATES PATENTS

| | | |
|---|---|---|
| 2,725,128 | Martin | Nov. 29, 1955 |
| 2,867,310 | Martin | Jan. 6, 1959 |
| 2,910,156 | Apple | Oct. 27, 1959 |
| 2,960,174 | Walker | Nov. 15, 1960 |

FOREIGN PATENTS

| | | |
|---|---|---|
| 220,485 | Australia | Feb. 17, 1959 |